ing a gate. The gate comprises a pair of gate members
United States Patent
Moret

[11] 3,867,959
[45] Feb. 25, 1975

[54] DOUBLE-ACTING PRESSURIZED SLIDE GATE

[75] Inventor: Bertus Moret, Salt Lake City, Utah

[73] Assignee: Kennecott Copper Corporation, New York, N.Y.

[22] Filed: Jan. 18, 1974

[21] Appl. No.: 434,432

[52] U.S. Cl. .................................. 137/602, 285/156
[51] Int. Cl. ............................................ F16l 41/00
[58] Field of Search ........... 137/154, 237, 238, 241, 137/602; 285/156

[56] References Cited
UNITED STATES PATENTS
2,630,293  3/1953  Smith .................................. 137/238
2,823,807  2/1958  Hempel ........................... 285/156 X Primary Examiner—Robert G. Nilson
Attorney, Agent, or Firm—Mallinckrodt & Mallinckrodt

[57] ABSTRACT

A duct system for carrying noxious gases to one or more outlets therefor includes a main duct having a gateway and entryway transversely thereof for receiving a gate. The gate comprises a pair of gate members secured in confronting, mutually spaced relationship, each gate member being sufficiently less in area than the cross-sectional area of the duct to provide a peripheral passage between the gate member and the inner wall face of the duct. Means for supplying fresh air between the gate members is attached to the gateway entrance, so that fresh air flows through the peripheral passages and blocks the flow of noxious gases while simultaneously supplying fresh air to the outlets of the system.

5 Claims, 5 Drawing Figures

PATENTED FEB 25 1975 3,867,959
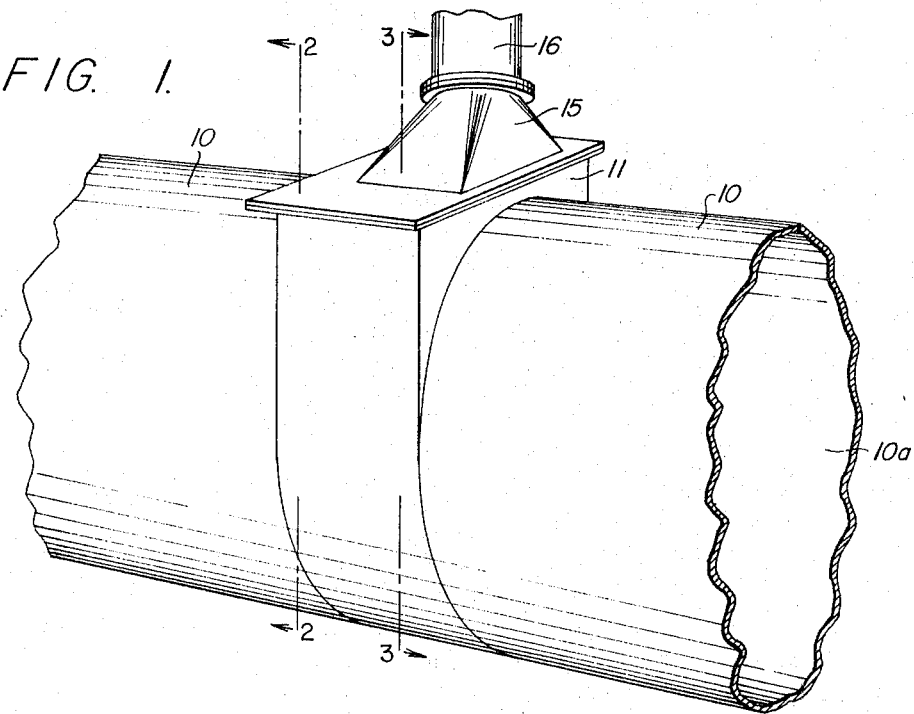
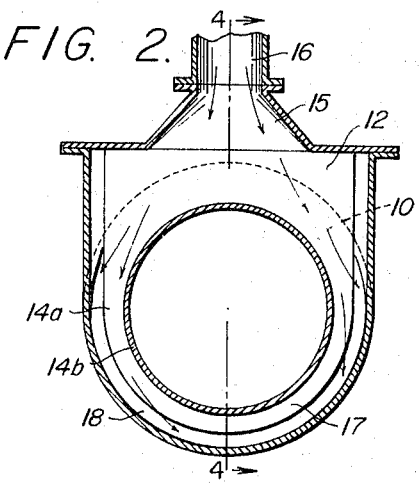
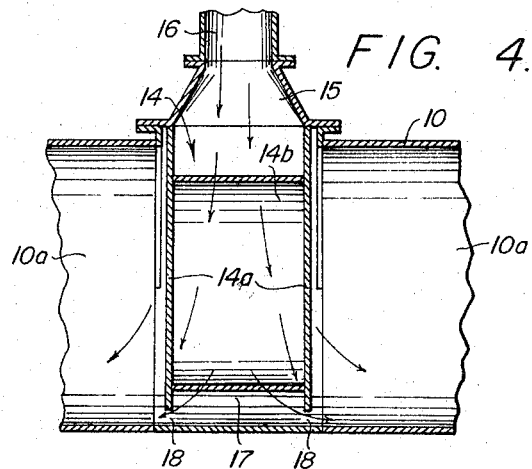
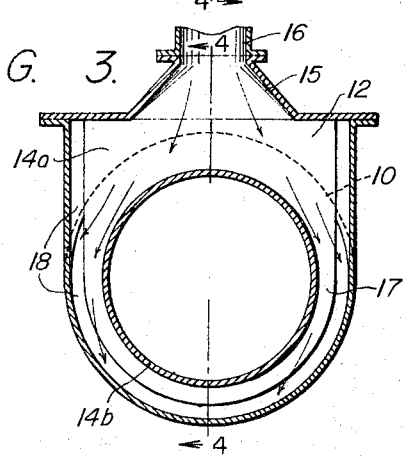
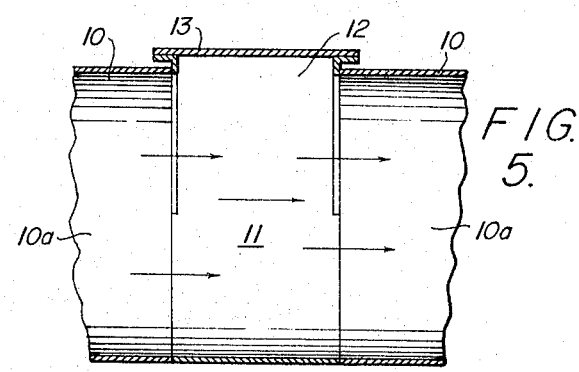

DOUBLE-ACTING PRESSURIZED SLIDE GATE

BACKGROUND OF THE INVENTION

1. Field

The invention is in the field of duct systems provided with gates therein to block off flow of gases therethrough.

2. State of the Art

In many duct systems carrying noxious gases, e.g., for processing purposes, it is necessary or desirable to periodically halt flow of the gases therethrough so maintenance work can be performed in processing or other areas served by the system. In such cases, it is important that all noxious gas flow to these areas be stopped and that fresh air be suppled to such areas.

There have been many types of duct systems wherein special gates have been provided to seal off flow of gases therethrough. All of these, however, whether made up of one or a pair of gate members, have included some type of valve seat within the duct and some type of mechanical sealing mechanism for the gate or gates. A fluid such as air under pressure has been used to prevent leaks around imperfect mechanical seals, but pressurized fluids have never been used in place of mechanical seals so far as applicant knows.

SUMMARY OF THE INVENTION

According to the invention, a duct system for carrying noxious gases to one or more outlets includes a main duct having a transverse gateway and entryway thereacross for receiving a gate. The gate comprises a pair of gate members secured in confronting, mutually spaced relationship, each gate member being sufficiently less in area than the cross-sectional area of the duct so that a peripheral passage is formed between that gate member and the inner wall face of the duct. Fresh air is supplied between the gate members at a pressure slightly above the pressure of the noxious gases normally flowing through the duct, so that, as fresh air flows throught the peripheral passages, flow of noxious gases in the duct is blocked and fresh air is supplied instead. When normal flow within the duct system is to be re-established, the gate is removed from the gateway and a plate is secured across the resulting open entrance to the gateway.

THE DRAWINGS

The best mode presently contemplated for carrying out the invention is illustrated in the following drawings in which:

FIG. 1 is a fragmentary perspective view of a duct system conforming to the invention;

FIG. 2, a transverse vertical section taken on the line 2—2 of FIG. 1 and drawn to a somewhat smaller scale;

FIG. 3, a view similar to FIG. 2 taken on the line 3—3 of FIG. 1;

FIG. 4, a longitudinal vertical section taken on either the line 4—4 of FIG. 2, or the line 4—4 of FIG. 3; and FIG. 5, a view corresponding to that of FIG. 4, but showing the gate removed from the gateway and the resulting opening closed by an applied closure plate.

DETAILED DESCRIPTION OF THE ILLUSTRATED EMBODIMENT

FIG. 1 shows a fragment of a main duct 10 of a duct system of the invention having a gateway section 11 interposed therein and extending transversely thereacross, which section defines an entryway 12 into the duct. The duct system is adapted for carrying noxious gases from a source of same (not shown) on one side of gateway section 11 to duct outlets (not shown) in processing or other areas on the other side of gateway section 11. Duct 10 is preferably, but not necessarily, of cylindrical configuration.

Entryway 12 will normally be tightly closed, as by means of a cover plate 13, FIG. 5, bolted or otherwise removably secured to the top of gateway section 11, a gasket (not shown) being advantageously interposed for sealing purposes.

When it is desired to temporarily cut off flow of noxious gases to the duct outlets, so maintenance or other work can be safely performed in the areas served by such outlets, plate 13 is removed an a gate 14, see particularly FIG. 4, is inserted into gateway section 11 through entryway 12, Gate 14 is preferably secured to and depends from an adapter fitting 15, which is itself secured to a conduit 16 for pressurized air and is adapted to be secured across entryway 12 in place of cover plate 13.

Gate 14 comprises a pair of gate members 14a secured to each other in mutually spaced, confronting relationship by means of a spacer connector 14b of sufficiently less cross-sectional area than the gate members as to provide an encompassing flow passage 17 therearound. Gate members 14a are sufficiently less in cross-sectional area than the passage 10a through duct 10 to provide passageways 18 between such gate members and the inside peripheral face of the duct at respectively opposite sides of gateway section 11 when gate 14 is installed in gateway section 11. When gate 14 is so installed, flow passage 17 is in flow communication with passageways 18 and, thus, with duct passage 10a on both sides of gateway section 11.

Although it is advantageous to provide duct 10 of the usual cylindrical configuration, gate members 14a partially circular, and spacer connector 14b cylindrical, all as here illustrated, other configurations can be employed if desired.

Air under pressure, usually fresh atmospheric or room air, is supplied to conduit 16 as by means of a blower (not shown). Pressurization of the air must be greater than flow pressure of the noxious gas in duct 10, so as to block flow of such noxious gas through the particular passageway 18 concerned and so as to cause flow of the supplied air through the other passageway 18 into and through the part of duct passage 10a that leads to the duct outlets i.e., that is downstream of gate 14. This ensures a safe environment in areas served by duct outlets so maintenance or other work can take place without danger to workers by exposure to the normally flowing noxious gas.

It will be noted that there are no seals for the gate with respect to duct 10 and that nothing is done to nor installed on the inside face of the duct. In fact, the gate never touches the inside face of the duct. The only thing necessary for use of the gate is to provide a gateway and entryway for gate installation across the interior of the duct.

Whereas there is here illustrated and described an embodiment of the inventive concepts disclosed herein that is presently contemplated to be the best mode of carrying out the invention in actual practive, it is to be understood that changes may be made without departing from such inventive concepts as particularly pointed out in the following claims.

I claim

1. In a duct system for carrying noxious gases to one or more outlets, the combination of a duct leading to said one or more outlets and having a gateway extending transversely across said duct upstream from said one or more outlets and defining an entryway for receiving a gate; a gate sufficiently less in area than the cross-sectonal area of the interior flow passage through said duct to provide peripheral passages between said gate and the inner wall face of said duct at opposite sides, respectively, of said gateway; and means for connecting a source of pressurized air over said entryway for supplying a flow of air into said gateway and through said passages, so as to both block the flow of noxious gas past the gate and to supply air to said one or more outlets of the system.

2. A combination in accordance with claim 1, wherein the gate comprises two gate members in confronting spaced relationship interconnected by spacer-connector means sufficiently less in area than the gate members to define a flow passage encompassing the gate between said gate members.

3. A combination in accordance with claim 2, wherein the duct is cylindrical, the gate members are at least partially circular, and the spacer-connector is cylindrical.

4. A combination in accordance with claim 3, wherein the gate members extend through the entryway and are secured to the means for connecting the gate to a source of pressurized air.

5. A combination in accordance with claim 4, wherein the means for connecting the gate to a source of pressurized air comprises an adapter arranged to fit over and be removably connected to the gateway.

* * * * *